Patented Dec. 26, 1922.

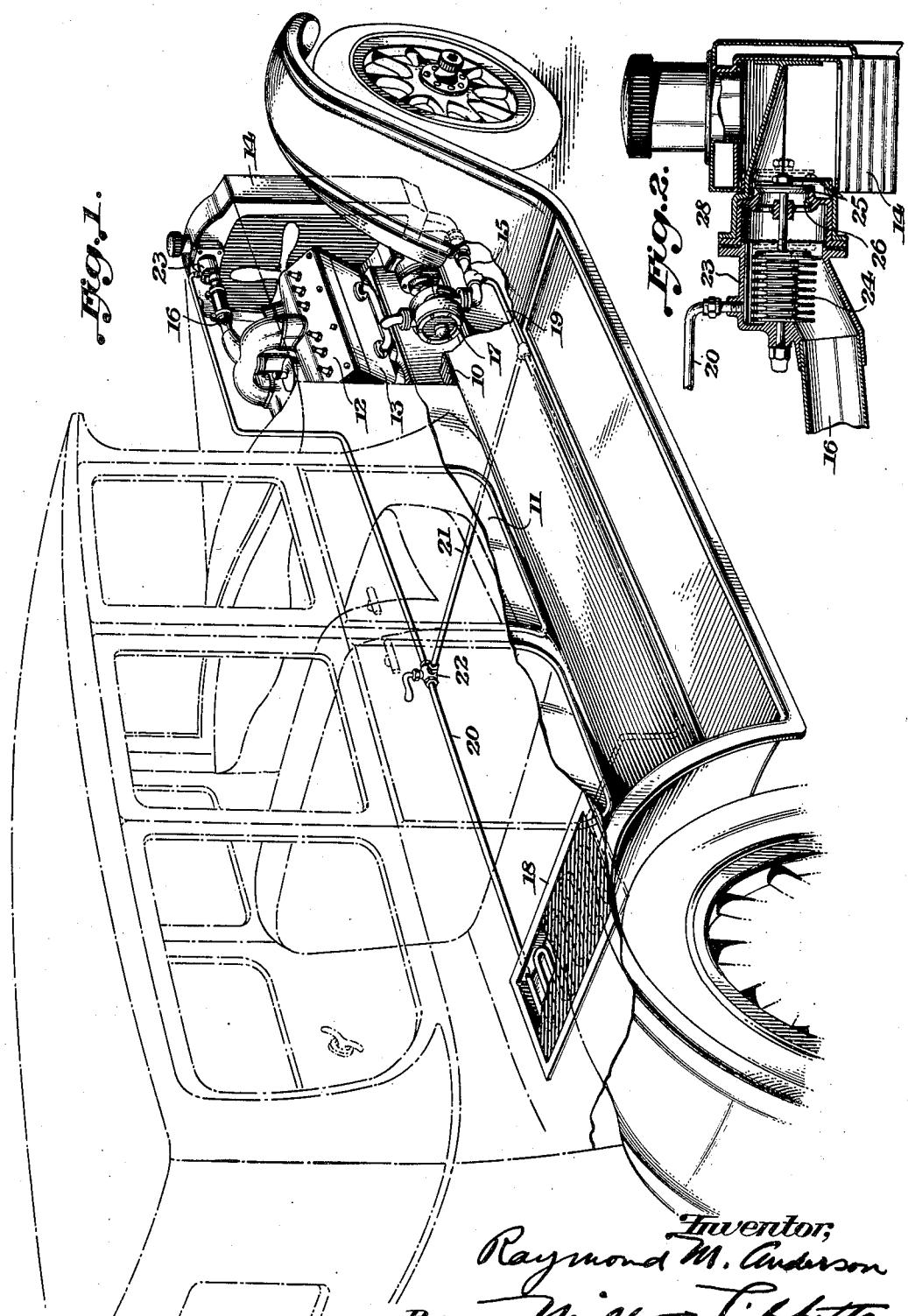

1,439,857

UNITED STATES PATENT OFFICE.

RAYMOND M. ANDERSON, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed June 28, 1918. Serial No. 242,381.

*To all whom it may concern:*

Be it known that I, RAYMOND M. ANDERSON, a citizen of the United States, and resident of Detroit, Wayne County, State of Michigan, have invented certain new and useful Improvements in Motor Vehicles, of which the following is a specification.

This invention relates to motor vehicles and particularly to motor cooling and body heating devices.

One of the objects of the invention is to provide a motor vehicle having a water cooled motor, with a body heating device connected to the motor cooling system so that some of the heated water from the motor water jackets will flow through the body heating device, to thereby heat the body and at the same time to assist in cooling the motor.

Another object of the invention is to provide a body heating device and a motor cooling system so arranged that the body heater will operate as a radiator until the temperature of the cooling water reaches a given predetermined temperature.

Other objects and advantages will appear from the following description taken in connection with the drawings which form a part of this specification, and in which:

Fig. 1 is a view of a motor vehicle embodying the invention; and

Fig. 2 is a detail sectional view of the thermostat device.

Referring to the drawings, 10 indicates the frame of a motor vehicle and 11 is a body mounted thereon. 12 is a motor, preferably of the hydrocarbon type and having water jackets 13 which surround the cylinders.

A radiator 14 of the usual type is shown as mounted on the vehicle frame forwardly of the motor, this radiator being for the purpose of cooling the water that passes through the motor jackets. Piping extends from the motor to the radiator, one pipe 15 connecting the lower part of the radiator with the lower part of the motor jacket, and a pipe 16 connecting the upper part of the motor jacket with the upper part of the radiator. By this arrangement of piping a constant circulation of water is kept up through the jacket and radiator. Usually a pump 17 is arranged in the pipe 15 and driven by the motor, for the purpose of increasing the circulation of the water through the system.

Arranged within the body 11 of the vehicle is a heater or radiator 18 which may be of any desired form, being for the purpose of heating the interior of the body. This heater or radiator is connected to the water circulation system of the motor by means of piping, a pipe 19 connecting the heater with the pipe 15 between the radiator and the pump, and a pipe 20 connecting the heater 18 with the pipe 16 between the motor and the radiator. There is also a pipe 21 extending between the pipes 20 and 19 and short-circuiting the heater 18, and a valve 22, accessible inside of the body 11, controls the flow of water so that it may be directed either through the heater 18 or this by-pass pipe 21.

A thermostat device 23 is arranged in the pipe 16 between the motor and the radiator, this device being shown somewhat in detail in Fig. 2. It comprises a thermostat 24 of conventional form and adapted to expand as the heated water passes over it, and a valve 25 connected to the thermostat and adapted to close the port 26, as shown in full lines in Fig. 2, when the thermostat is cold, and to open it, as shown in dotted lines in Fig. 2, when the thermostat is hot. Thus, when the motor is cold, as when starting, the port 26 will be closed and the water from the motor jackets is prevented from passing to the radiator. This water will therefore be forced through the pipe 20, the heater 18, and the pipe 19, and by reason of the relatively small capacity of the heater, this water will be quickly heated up by the motor and will at the same time furnish heat for the body 11. As soon as the temperature of the water rises to such a degree that the thermostat 24 is extended, the port 26 will be opened and some of the water will pass into and through the radiator 14. It is understood that the thermostat 24 will be so adjusted in connection with its valve that the port will be somewhat restricted at all times so that some of the water will be continually circulated through the heater 18, unless possibly the temperature should rise to a considerable degree, in which case the port 26 may be opened wide.

The valve 22 is for the convenience of the occupants of the body 11 so that the heater 18 may be shut off thereby by-passing the water through the pipe 21.

It will be understood that other forms and modifications of the invention may be made without departing from the spirit or scope hereof.

Having thus described my invention, what I claim and desire to secure by Letters Patent is:

1. In combination with a vehicle body, a hydrocarbon motor having a water jacket, a radiator, intake and discharge conduits for the radiator connecting the same with the water jacket, a heater within the vehicle body connected to the water jacket in parallel with the radiator, and a thermostatically operated valve in one of said conduits adapted to open and close connection between the water jacket and radiator while permitting circulation between the water jacket and heater.

2. In combination with a vehicle body, a hydrocarbon motor having a water jacket, a radiator, intake and discharge conduits for the radiator connecting the same with the water jacket, a heater within the vehicle body having an intake conduit connected with the intake conduit of the radiator and a discharge conduit connected to the discharge conduit of said radiator, a thermostat in said radiator intake conduit, and a valve operated by said thermostat and located in said radiator intake conduit between the radiator and the heater intake conduit.

3. In combination with a vehicle body, a hydrocarbon motor having a water jacket, a radiator having communication with the water jacket, a vehicle body heater also having communication with the water jacket and located in the vehicle body, and means confining the water circulation to the heater and jacket until the circulating water reaches a predetermined temperature and thereafter opening the circulation to the radiator.

4. In combination with a vehicle body, a hydrocarbon motor having a water jacket, a radiator having communication therewith, a vehicle body heater also communicating with the water jacket and located in the vehicle body, means controlling the circulation of water through the radiator, a by-pass adapted to short-circuit the heater, and a manually operable valve for controlling the circulation of water through said by-pass.

5. In combination with a vehicle body, a hydrocarbon motor having a water jacket, a radiator, conduits connecting the radiator with said jacket, a vehicle body heater located in the body of the vehicle and connected to said conduits, a thermostatically controlled valve located in the intake conduit of said radiator, the heater connection to said intake conduit communicating with said conduit on the water jacket side of said valve.

In testimony whereof I affix my signature.

RAYMOND M. ANDERSON.